(12) United States Patent
Fain et al.

(10) Patent No.: US 10,371,711 B2
(45) Date of Patent: Aug. 6, 2019

(54) DAMPED LINEAR ACCERELOMETER

(71) Applicant: COMMISSARIAT A L'ENERGIE ATOMIQUE ET AUX ENERGIES ALTERNATIVES, Paris (FR)

(72) Inventors: Bruno Fain, Grenoble (FR); Aboubacar Chaehoi, Grenoble (FR); Philippe Robert, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 216 days.

(21) Appl. No.: 15/454,249

(22) Filed: Mar. 9, 2017

(65) Prior Publication Data

US 2017/0261528 A1    Sep. 14, 2017

(30) Foreign Application Priority Data

Mar. 11, 2016    (FR) ...................................... 16 52048

(51) Int. Cl.
*G01P 1/00* (2006.01)
*G01P 15/12* (2006.01)
*G01P 15/08* (2006.01)

(52) U.S. Cl.
CPC ............ *G01P 1/003* (2013.01); *G01P 15/123* (2013.01); *G01P 2015/0817* (2013.01); *G01P 2015/0882* (2013.01)

(58) Field of Classification Search
CPC ............................... G01P 1/003; G01P 15/123

(Continued)

(56) References Cited

U.S. PATENT DOCUMENTS

| 6,311,556 B1* | 11/2001 | Lefort | ..................... G01P 1/006 |
| | | | 73/514.29 |
| 2003/0094881 A1* | 5/2003 | Grade | ................... B81B 3/0078 |
| | | | 310/309 |

(Continued)

FOREIGN PATENT DOCUMENTS

| EP | 0 981 052 A2 | 2/2000 |
| EP | 2 151 691 A2 | 2/2010 |
| EP | 2 455 329 A2 | 5/2012 |

OTHER PUBLICATIONS

French Preliminary Search Report dated Oct. 5, 2016 in French Application 16 52048 filed on Mar. 11, 2016 (with English Translation of Categories of Documents).

(Continued)

*Primary Examiner* — Tarun Sinha
(74) *Attorney, Agent, or Firm* — Oblon, McClelland, Maier & Neustadt, L.L.P.

(57) ABSTRACT

Linear accelerometer comprising a fixed part, a rotationally moving part in the plane of the accelerometer around an axis of rotation orthogonal to the plane of the accelerometer, the moving part comprising a centre of gravity distinct from the point of intersection of the axis of rotation and the plane of the accelerometer, means forming pivot link between the moving part and the fixed part, means for detecting the displacement of the moving part with respect to the fixed part, means for viscous damping the displacement of the moving part in said plane, said viscous damping means comprising interdigitated combs, at least one first comb on the moving part and at least one second comb on the fixed part (2), the first comb and the second comb being interdigitated.

17 Claims, 6 Drawing Sheets

(58) Field of Classification Search
USPC ...................................................... 73/514.13
See application file for complete search history.

(56) References Cited

U.S. PATENT DOCUMENTS

2003/0159511 A1* 8/2003 Zarabadi ............. G01P 15/0888
73/514.02
2005/0002079 A1* 1/2005 Novotny ............. B81C 1/00246
359/245

OTHER PUBLICATIONS

Woo-Tae Park, et al., "Encapsulated Submillimeter Piezoresistive Accelerometers", Journal of Microelectromechanical Systems, IEEE, vol. 15, (3), 2006, 8 pgs.
Lee A. Christel, et al., "Vibration Rectification in Silicon Micromachined Accelerometers", IEEE, 1991, 4 pgs.
Aaron Partridge, et al., "A High-Performance Planar Piezoresistive Accelerometer", Journal of Microelectromechanical Systems, IEEE, vol. 9, (1), 2000, 9 pgs.

* cited by examiner

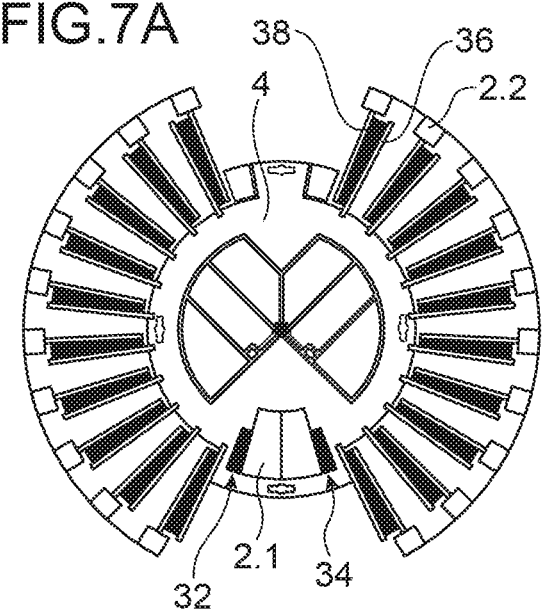
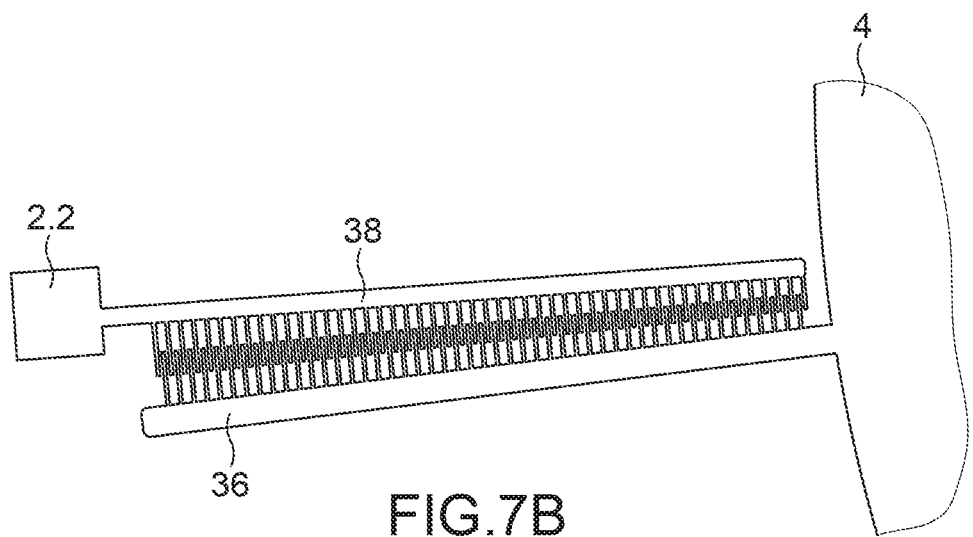

DAMPED LINEAR ACCERELOMETER

TECHNICAL FIELD AND PRIOR ART

The present invention relates to a MEMS and/or NEMS damped linear accelerometer.

A MEMS (microelectromechanical system) and/or NEMS (nanoelectromechanical system) accelerometer is intended to detect accelerations. It comprises a suspended part or suspended mass with respect to a support and means for detecting the displacement of the mass. The accelerations undergone by the accelerometer make the mass move with respect to the support, this movement is detected by the detection means, the characteristics of this movement are treated and an acceleration is deduced therefrom.

Yet, if the accelerometer is exposed to a severe vibratory environment, it is likely to have a degraded operation, or even to be damaged in an irreversible manner.

Several solutions have been developed to reduce this risk of damage.

The electronics of the accelerometer may be such that a suitable filtering is carried out. This solution is not suitable when the undesirable vibrations are at the same frequency as the frequency of interest. Moreover, electronic filtering does not make it possible to protect the mechanical structure of the accelerometer.

Another solution consists in eliminating the vibrations by producing a suitable mechanical structure for the accelerometer. Such a structure in general comprises a mechanical decoupling frame between the support and the moving mass. The mechanical properties of this decoupling frame determine which vibrations are filtered. The normal design of decoupling structures (low stiffness) makes it possible to filter vibrations at frequencies above 1 kHz, but they are not suited to filtering vibrations at frequencies below 1 kHz. The result is that vibrations at frequencies below 1 kHz, notably below 100 Hz, are not filtered in this solution and are thus detected.

Another solution consists in producing an accelerometer structure which is little or not sensitive to vibrations. For example, the structure may be such that it has mechanical deformation modes insensitive to vibrations. Another approach consists in controlling the frequency response of the MEMS, which makes it possible to reduce its sensitivity at certain frequencies, for example the resonance frequency may be reduced in order to be free of vibrations at higher frequencies.

The document "Encapsulated submillimeter piezoresistive accelerometers", W. Park, A. Partridge, R. N. Candler, V. Ayanoor-vitikkate, G. Yama, M. Lutz, and T. W. Kenny, *Journal of Microelectromechanical Systems*, vol. 15, no. 3, p 507 (2006) describes an encapsulated accelerometer for producing a damped accelerometer in order to minimise notably excitation shocks at the resonance frequency.

DESCRIPTION OF THE INVENTION

The aim of the present invention is to provide a linear accelerometer offering reduced sensitivity to high frequencies by reducing the pass band, while having good resolution.

The aforementioned aim is attained by an accelerometer comprising a moving part and a fixed part, said moving part being rotationally moveable and having a centre of gravity distinct from the centre of rotation of the moving part, means for detecting the displacement of the moving part and means capable of generating viscous damping of the moving part, the means capable of generating viscous damping being spread out between the moving part and the fixed part.

As a result of the implementation of a rotationally moving part, of which the centre of gravity is distinct from the axis of rotation, linear accelerations are detected.

Such a structure makes it possible to provide, on a reduced surface, a considerable mass making it possible to conserve good resolution while making it possible to generate considerable damping.

In an advantageous example, the damping applies on the outer periphery of the moving part. The rotational operation makes it possible to benefit from a significant lever arm for the forces applied on the outer periphery of the moving part, for example damping forces. Moreover it is possible to implement a large number of viscous damping means, advantageously over the whole circumference of the moving part, which makes it possible to generate considerable viscous damping and to do so with a reduced footprint. It is thus advantageously possible to provide a compact accelerometer with considerable damping.

By associating rotationally moving part and viscous damping, a linear accelerometer is produced providing considerable damping, of which the sensitivity to high frequencies is reduced without losing resolution.

Very advantageously, the viscous damping means are interdigitated combs spread out over the whole outer periphery of the moving part. Advantageously, the detection means are distinct from the damping means and are for example of piezoresistive type. Preferably, the moving part is suspended with respect to the fixed part in a zone different from the zone comprising the damping means, this zone comprising the detection means. By using different emplacements of the structure for damping and for detection, the footprint is further reduced.

It will be understood that the detection means may also be of capacitive or piezoelectric type. Furthermore, in certain cases, the detection means are merged with the damping means.

A very advantageous exemplary embodiment combines a rotationally moving mass, damping combs over the whole periphery of the moving mass and an anchoring of the moving part at the centre and a piezoresistive detection, it is then possible to obtain an accelerometer of limited total surface which nevertheless has the required surface to obtain the best compromise between cut-off frequency, resolution and surface.

The subject matter of the present invention is therefore a linear accelerometer comprising a fixed part, a rotationally moving part in the plane of the accelerometer around an axis of rotation orthogonal to the plane of the accelerometer, the moving part comprising a centre of gravity distinct from the intersection point of the axis of rotation and the plane of the accelerometer, suspension means between the moving part and the fixed part, forming a pivot link between the moving part and the fixed part and limiting translational displacements of the moving part with respect to the fixed part, means for detecting the displacement of the moving part with respect to the fixed part, viscous damping means for damping the displacement of the moving part in said plane, said viscous damping means comprising interdigitated combs, at least one first comb on the moving part and at least one second comb on the fixed part, the first comb and the second comb being interdigitated.

In the present application, "interdigitated combs" mean combs which are moveable with respect to each other, whether they are with surface variation, or with gap variation.

The at least one second comb of the fixed part and the at least one first comb of the moving part are advantageously at the same electric potential. Preferably the at least one second comb of the fixed part and the at least one first comb of the moving part are always at the same electric potential.

Preferably, the whole outer portion of the fixed part is at the same electric potential as the moving part. More preferably, the whole outer portion of the fixed part is always at the same electric potential as the moving part.

BRIEF DESCRIPTION OF THE DRAWINGS

The present invention will be better understood on the basis of the description that follows and the appended drawings, in which:

FIGS. 7A and 7B are top and detail views of an exemplary embodiment of an accelerometer with capacitive detection and with capacitive damping with surface variation.

DETAILED DESCRIPTION OF PARTICULAR EMBODIMENTS

Figure 1:
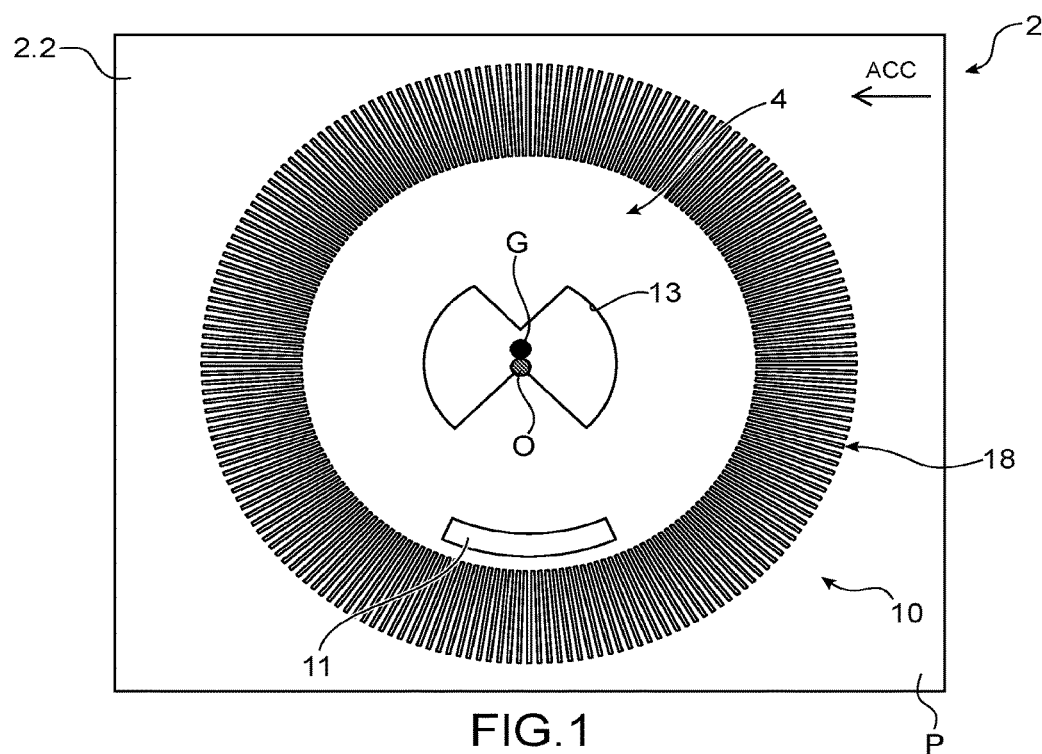
FIG. 1 is a top view of an exemplary embodiment of the accelerometer according to the invention, partially represented.

In FIG. 1 may be seen an exemplary embodiment of a linear accelerometer according to the invention. The accelerometer is a MEMS and/or NEMS accelerometer. For reasons of simplicity, reference will be made in the remainder of the description to a MEMS accelerometer or a MEMS sensor.

The accelerometer is intended to detect and to measure linear accelerations. For example, it detects the accelerations ACC oriented along the direction represented in FIG. 1.

The MEMS accelerometer extends in a plane P, this plane is the mean plane of the accelerometer. The accelerometer comprises a fixed part 2 and a moving part or mass 4, which is capable of being displaced with respect to the fixed part 2 in the plane P. The fixed part 2 is for example formed by layers transferred onto a substrate during steps of manufacturing the accelerometer and the moving part is produced by etching in said layers. The moving part 4 is rotationally moveable around an axis orthogonal to the plane of the substrate. The accelerometer comprises suspension means 6 of the moving part 4 with respect to the fixed part 2. The suspension means 6 (FIG. 2) are such that they allow rotational movements of the moving part 4 with respect to the fixed part. Preferably, the suspension means 6 limit as best as possible translational displacement in the plane P of the moving part.

The intersection point between the axis of rotation and the plane P is designated O.

The accelerometer also comprises means for detecting 8 the rotational displacement of the moving part 4 with respect to the fixed part 2.

The accelerometer also comprises viscous damping means 10 for damping the displacement of the moving part 4 with respect to the fixed part 2.

Figure 2:
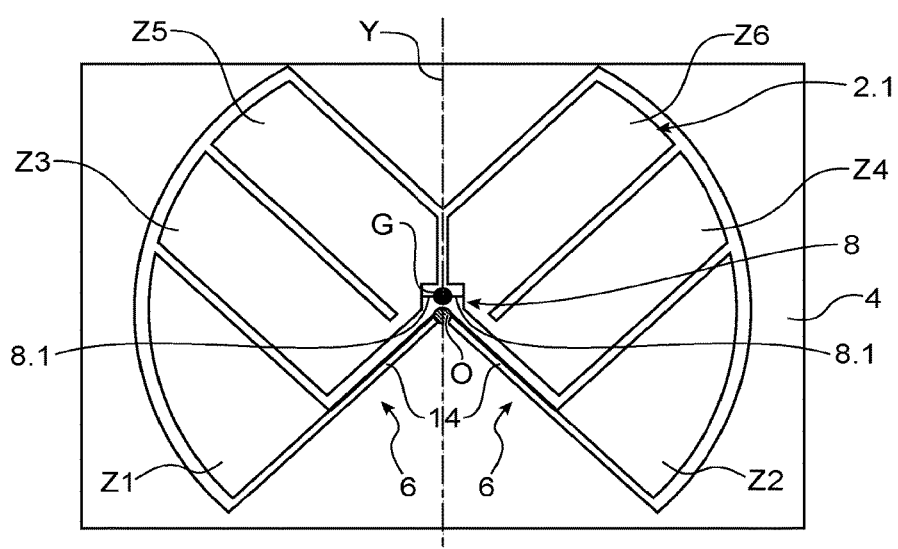
FIG. 2 is a detail view of the connection means between the fixed part and the moving part of the accelerometer of FIG. 1 and detection means.

The centre of gravity G of the moving part 4 is distinct from the axis of rotation, as is represented in FIG. 2. In the particular example of FIG. 1, the moving part 4 advantageously has a disc shape. The shift of the centre of gravity G with respect to the point O is obtained in the example of a moving part 4 by producing a first recess 11 in the moving part 4. In the representation of FIG. 1, the first recess 11 is produced in the lower part and the centre of gravity is displaced to the upper part moving away from O.

A disc-shaped rotationally moving part 4 facilitates the integration of the different elements of the accelerometer but a moving part having a different shape does not go beyond the scope of the present invention.

In the example represented, the fixed part 2 comprises a portion arranged inside the moving part 4, designated 2.1 (not represented in FIG. 1), in a second recess 13 of the moving part 4 and a part arranged on the outside of the moving part, designated 2.2. The shape of the second recess 13 could participate in the shift between the centre of gravity G and the point O instead of the first recess 11 or in combination.

In the example represented, the suspension means 6 are arranged between the moving part 4 and the inner portion 2.1 and the damping means 8 are spread out between the moving part 4 and the outer portion 2.2. This arrangement is in no way limiting and the opposite arrangement may be envisaged for example.

In the particular example of FIGS. 1 and 2, the inner portion 2.1 has the general shape of a butterfly having a symmetry plane going through the Y axis, which connects the point O and the centre of gravity G, the moving part 4 has a recess 12 of corresponding shape. The shape of the inner portion is also non-limiting.

In the example represented, the suspension means comprise two beams 14 extending symmetrically from the point O to the inner portion 2.1 in a symmetrical manner with respect to the Y axis. The two beams 14 form a pivot link between the moving part 4 and the inner portion 2.1 of the fixed part 2 while limiting the translational displacement of the moving part 4 in the plane P.

In the example represented and advantageously, the detection means are of piezoresistive type. They comprise two piezoresistive gauges 8.1 extending between the moving part 4 and the inner portion 2.1. The gauges 8.1 are arranged preferably symmetrically with respect to the Y axis and are arranged in general near to the centre of gravity G, as in the example represented. Preferably the gauges 8.1 have a small thickness compared to that of the moving part, so as to ensure a concentration of stresses.

In a very advantageous manner, the gauges 8.1 extend along an axis perpendicular to the Y axis, which makes it possible to maximise the effects of the accelerations on the gauges. The gauges are preferably differentially mounted. Detection means only comprising one gauge do not go beyond the scope of the present invention.

Advantageously and as is represented, the inner portion 2.1 comprises six electrically independent tracks Z1, Z2, Z3, Z4, Z5, Z6. Each beam 12 is anchored on a track Z1 and Z2. The implementation of these six zones enables a "4-wire" type measurement for each of the gauges. The principle of the 4-wire measurement consists in imposing a voltage and measuring a current (or vice versa) at the terminals of a resistance using two pads for the current and two pads for the voltage. This type of measurement makes it possible to be free of parasitic resistances of the access tracks: there are no voltage drops on the access tracks dedicated to voltage because the current therein is very low. In the example represented, the tracks Z3 and Z5 and Z4 and Z6 are connected by a common track, in the immediate proximity of the gauges, but this portion of several microns length is easily negligible with respect to the total length of the access tracks, which have a length of several hundreds of microns of metal tracks without counting the interconnections to the electronics. This common track does not hinder the 4-wire type measurement.

Piezoresistive type detection means have better linearity than capacitive type detection means, which makes it possible to minimise the effects of rectification.

Preferably, the moving part 4 and the outer portion 2.2 of the fixed part 2 are connected to the same potential to avoid the appearance of electrostatic effects to which such a structure may be sensitive.

The viscous damping means will now be described. In the example represented and advantageously, they are interdigitated combs 16, 18, the comb(s) 16 being fixed to the outer portion 2.2 of the fixed part 2 and the comb(s) 18 being integral in movement with the moving part. The damping means are in the example represented and very advantageously with gap variation, they provide greater damping than damping means with combs with surface variation, but such damping means may nevertheless be envisaged and will be described below.

Advantageously, the moving part 4 has fingers 20 over the whole outer circumference of the moving part 4 and fingers 22 line the whole edge of the outer portion 2.2 facing the outer circumference of the moving part 4.

Figure 3:
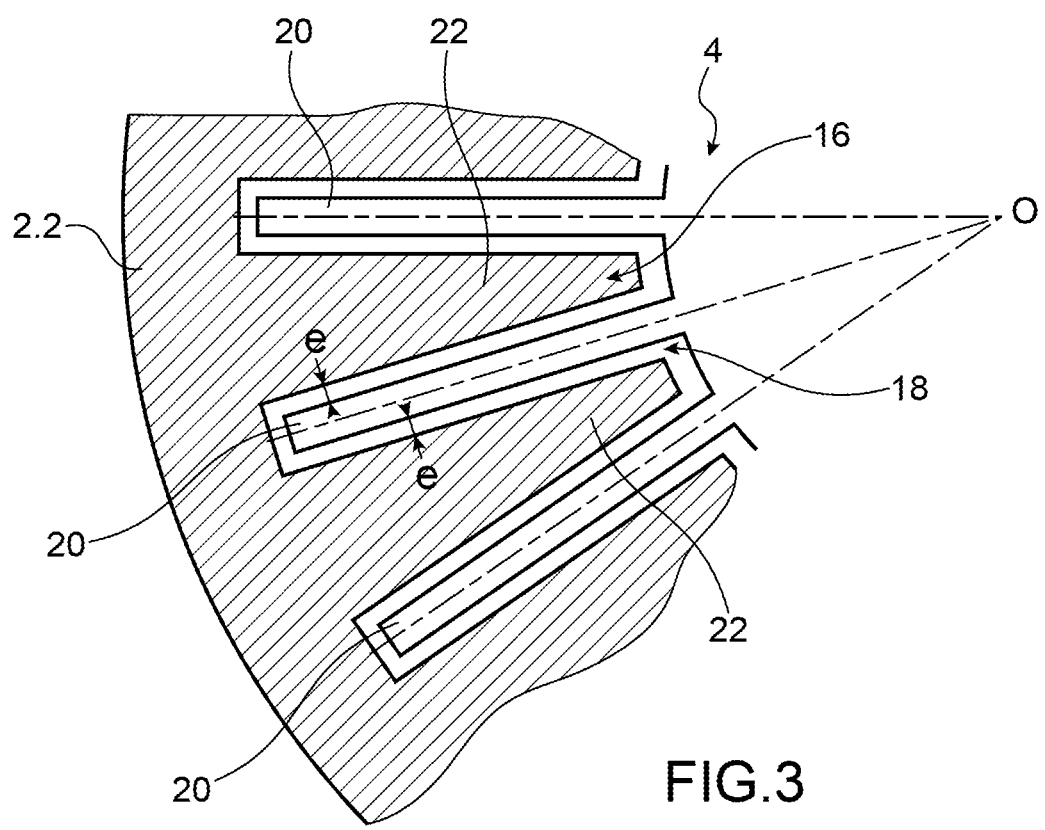
FIG. 3 is a schematic detail view of the viscous damping means of the accelerometer of FIG. 1, FIGS. 4A to 4J are schematic representations of different steps of an example of a method for producing the accelerometer of FIG. 1, FIGS. 5A and 5B are top and detail views of an exemplary embodiment of an accelerometer with capacitive detection.

The fingers 20 form a single annular comb and the fingers 22 form a single comb. Each finger 20 of the comb 18 is received between two fingers 22 of the comb 16 and vice versa. In FIG. 3 may be seen a schematic representation of a detail view of these damping means, this representation not being to scale.

Preferably, the fingers of the comb 18 extend radially on the circumference of the moving part 4. Thus, all the force applying on the fingers participates in the damping, if not only the component orthogonal to the diameter of the moving part is efficient.

Preferably, the fingers 20 of the comb 18 are all identical. In the example represented, the fingers 20 have a rectangular shape but it will be understood that fingers having other shapes, for example a trapezoidal shape, do not go beyond the scope of the present invention. The fingers 22 have a shape such that the faces facing the fingers 20 and 22 are substantially parallel.

It will be understood that it is possible to provide fingers on an angular zone only of the circumference of the moving part 4. In an alternative embodiment, it is possible to provide several combs on the circumference of the moving part 4 spread out in any way. Moreover, the fingers may have different dimensions.

Preferably, the damping means comprise pairs of combs arranged in a diametrically opposite manner with respect to the point O and advantageously these combs have the same number of fingers and the same facing surface. Each pair applies to the moving part 4, more particularly to the point O, a damping torque, which is all the greater the bigger the lever arm.

In a similar manner, on the outer portion 2.2, the fingers 22 are preferably substantially all identical.

By making the damping means symmetrical, a homogeneous and balanced damping is applied at the centre of rotation of the moving part.

The operation of these damping means is the following:

The movement between the two interdigitated combs 16, 18 generates viscous effects in the fluid surrounding the combs. The fluid is "crushed" between the fingers of the combs, which induces in return a damping force which is proportional to the speed of the comb and which opposes the movement. Thus, high frequencies may be filtered.

The damping effects generated by the different fingers are added together, the more numerous and of large size the combs, the more the damping is pronounced.

Preferably, the distance between the facing faces of two fingers is small, this distance e may be designated "thickness of the film of fluid". The smaller this distance, the greater the damping. Advantageously, the thickness e of film of fluid is constant on either side of each finger, and even more advantageously for all the fingers. This thickness is considered when the moving part is at rest, because during detection the fingers of the moving part are displaced between two fingers and the distance between a fixed finger 22 and a moving finger 20 varies during the displacement.

Also preferably, it is sought to produce combs with a large surface, the surface of each finger facing another finger.

The higher the number of interdigitated fingers, the greater the damping. The accelerometer of FIG. 1 advantageously has an optimised occupation of space by the interdigitated fingers, which are spread out over the whole circumference of the moving part.

As described above, the detection means may be of capacitive type. It is possible to envisage that the interdigitated combs are used as detection means, these then being polarised. Nevertheless, it is preferable to produce detection means distinct from the damping means, which makes it possible to optimise separately the detection means and the damping means.

Moreover, in the example represented implementing detection means of piezoresistive type, the detection means occupy an emplacement different from that occupied by the damping means, which makes it possible to optimise the occupation of space and to limit the bulk of the accelerometer.

Figure 5A:
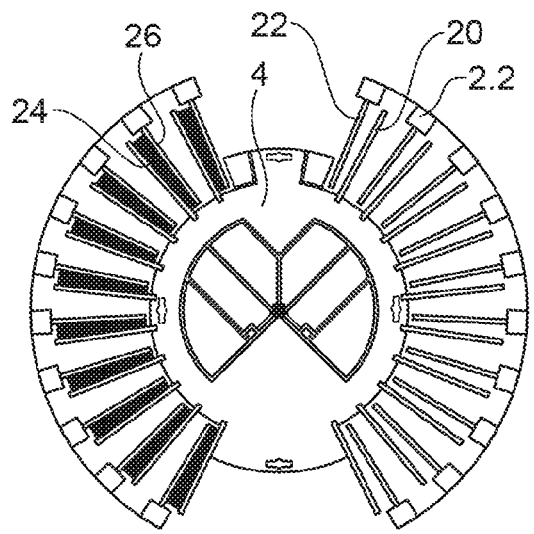
Figure 5B:
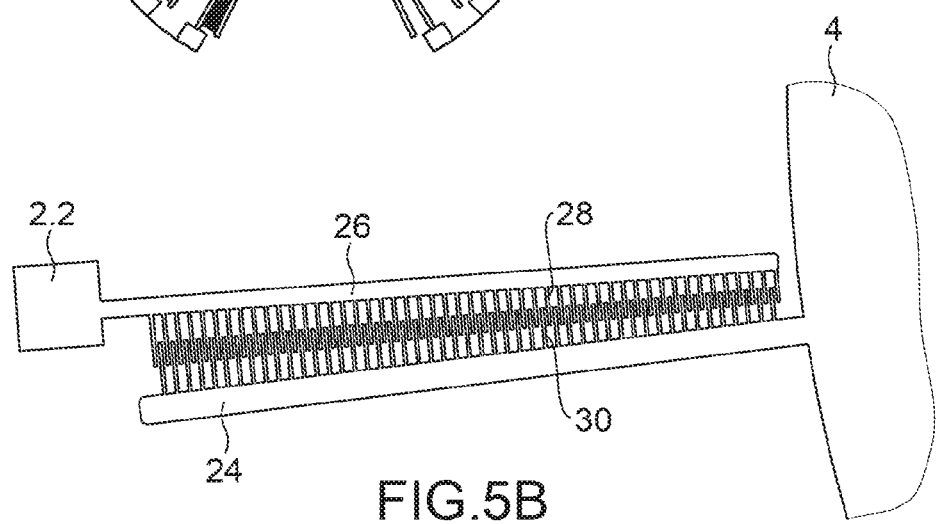

According to an alternative embodiment, the detection means could be of capacitive type. In FIGS. 5A and 5B may be seen an exemplary embodiment of an accelerometer with capacitive detection.

The detection means are formed by pairs of interdigitated combs 24, 26, a comb 24 of each pair being integral in movement with the moving part 4 and the other comb 26 is fixed with respect to the fixed part, more particularly the outer portion 2.2, the fingers 28, 30 extending perpendicularly to the radius of the moving part. In the example represented and preferably, the detection is carried out by surface variation.

The moving part is surrounded in part by damping means with facing fingers 20, 22, as described above, and in part by capacitive detection means.

Figure 6:
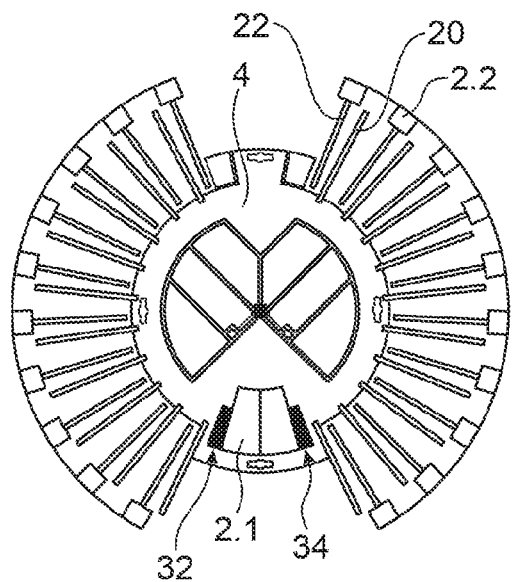
FIG. 6 is a top view of another example of accelerometer with capacitive detection.

In an alternative embodiment represented in FIG. 6, the capacitive detection means are arranged between the moving part and the fixed inner portion 2.1 and comprise two pairs of interdigitated combs 32, 34 with surface variation. In this alternative embodiment, the damping means are similar to those of the piezoresistive detection accelerometer of FIG. 1.

In FIGS. 7A and 7B may be seen a structure wherein the damping means are realised by interdigitated combs 36, 38 with surface variation similar to those used for capacitive detection in FIGS. 5A and 5B. Combs 36 are spread out over the whole periphery of the moving part 4 and combs 38 are fixed with respect to the outer portion 2.2. The detection is carried out by two pairs of interdigitated combs 32, 34 like those of FIG. 6. In an alternative embodiment, the detection could be piezoresistive or even piezoelectric.

These exemplary examples have the advantage of having detection means distinct from the damping means.

In an advantageous exemplary embodiment, the accelerometer comprises a cap assuring a protection of the mechanical structure. Moreover, the cap may make it possible to delimit a sealed volume around the mechanical structure, which may be filled with a fluid of which the viscosity may be adjusted, which intervenes in the level of damping. For example, the volume may be filled with pressurised air or with a fluid offering a viscosity greater than that of air, such as xenon. In an alternative embodiment, the volume could be filled with a liquid, further increasing the damping effect.

An example of dimensioning will now be given.

The moving part has for example a radius comprised between 100 μm and 1000 μm.

The damping fingers have a length for example comprised between 10 μm and 500 μm.

At rest, the distance e between the facing faces of the fingers of the moving part and the outer portion is for example comprised between 0.1 μm and 10 μm The thickness of the structure is for example comprised between 10 μm and 100 μm.

The articulation beams forming the pivot between the moving part 4 and the inner portion 2.1 have for example a width comprised between 0.1 μm and 10 μm and a length comprised between 1 μm and 100 μm.

The radius of the recess of the moving part lodging the inner portion is for example comprised between 50 μm and 20 μm.

The operating dynamic of such an accelerometer is determined by the maximum stress at the level of the gauges on the one hand and the limiting noise on the other hand. The dynamic is calculated with the max signal/min signal ratio.

The max signal is limited by the stress in the gauges and the min signal is limited by the resolution of the system, i.e. the limiting noise.

If the stress in the gauges is limited to 100 MPa and by considering that the range of acceleration, which can be measured, may be adjusted from 2 mg-10 g, or 20 mg-100 g, for example, by choosing the position of the centre of gravity. Typically, this dynamic is 5000=10/0.002 or 5000=100/0.020, according to the arrangements.

For example, thanks to the invention, it is possible by considering a moving part of mass comprised between $10^{-9}$ and $10^{-7}$ kg to obtain a cut-off frequency that can be lowered at least up to 1 Hz.

The cut-off frequency may be written $fc=\frac{1}{2}\pi*C/\Gamma$, with C the angular stiffness and $\Gamma$ the angular damping.

It should be noted that the addition of damping means has the effect of increasing thermomechanical noise, which is proportional to $\Gamma^{1/2}/m$ (m being the mass of the moving part of the accelerometer). Thermomechanical noise increases with damping. Consequently, if a low cut-off frequency is desired, this implies strong damping, which can generate thermomechanical noise reducing the resolution of the accelerometer. By choosing in a suitable manner the dimensioning of the accelerometer, i.e. by choosing a sufficiently large mass, for example comprised between $10^{-9}$ kg and $10^{-7}$ kg, it is then possible to obtain a cut-off frequency and to be free at least in part from thermomechanical noise.

$\Gamma$ may be comprised between $10^{-14}$ N·m·s, which corresponds to weak damping, and $10^{-8}$ N·m·s, which corresponds to strong damping.

The operation of the accelerometer will now be described:

When the accelerometer is subjected to an acceleration, the moveable structure is subjected to a force uniformly spread out on the structure. This force may be described as a force applied at one point at the level of the centre of gravity of the moving part. Under the action of this force, the moving part is rotationally displaced with respect to the fixed part, integral with the substrate, around the axis of rotation defined by the suspension beams. The amplitude of this displacement is determined by viscous phenomena, which mainly appear at the level of the damping means.

The cut-off frequency is adjusted thanks to the level of damping applied to the moving part, as explained above.

If the frequency of the signal is below the cut-off frequency of the accelerometer, the amplitude of the displacement is not reduced (signal of interest). If the frequency of the signal is above the cut-off frequency of the MEMS, the amplitude of the displacement is considerably reduced.

In both cases, the displacement of the moving part is detected by the detection means, in the example represented in FIGS. 1 and 2 the displacement induces stresses in the piezoresistive gauge(s).

The variation in resistance is read by dedicated electronics, which processes it and delivers the output signal making it possible to obtain the detected acceleration.

An example of method for manufacturing an accelerometer according to the invention will now be described in relation with FIGS. 4A to 4J.

On the one hand, a first sub-assembly is produced on the support substrate (FIG. 4A to 4E).

On a first substrate 100, designated support, which could be made of semi-conductor material, silicon for example, a deposition of a sacrificial layer 102 is carried out. This dielectric layer could advantageously be made of silicon oxide deposited by PECVD (plasma enhanced chemical vapour deposition), LPCVD (low pressure chemical vapour deposition) or by thermal oxidation. Its thickness could be comprised between several hundreds of nanometers and several microns, 5 μm for example. A layer of conducting material 104 is then deposited, preferentially based on Si or SiGe, and of thickness comprised for example between 200 nm and 5 μm. It is also possible to start from a SOI (silicon on insulator) type substrate.

Figure 4A:
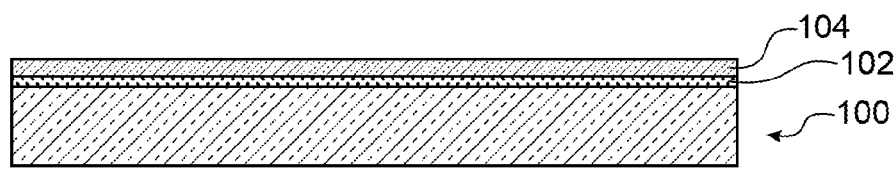

The element thus formed is represented in FIG. 4A.

During a following step, a lithography and an etching are carried out to define the gauge, then a dielectric layer 106 of same nature as previously, advantageously silicon dioxide, is deposited.

Figure 4B:
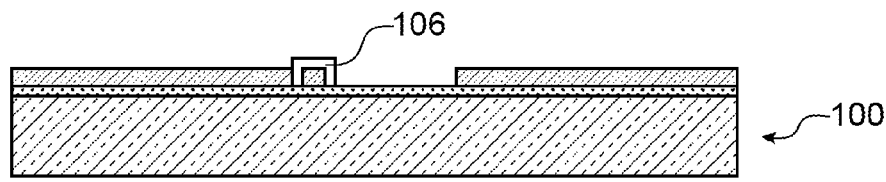

The element thus formed is represented in FIG. 4B.

During a following step, a layer of silicon 108 is formed for example by LPCVD or PECVD on the layer 104 and on the sacrificial layer, over a thickness for example comprised between 5 μm and 50 μm.

Figure 4C:
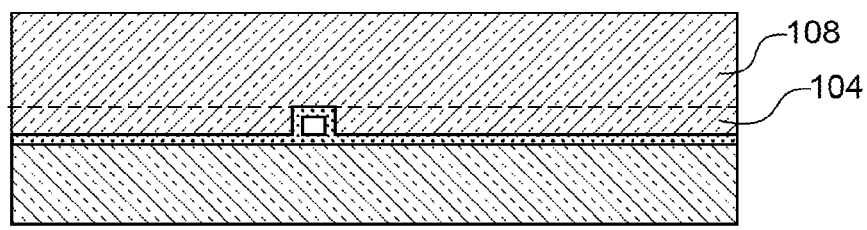

The element thus formed is represented in FIG. 4C.

Figure 4D:
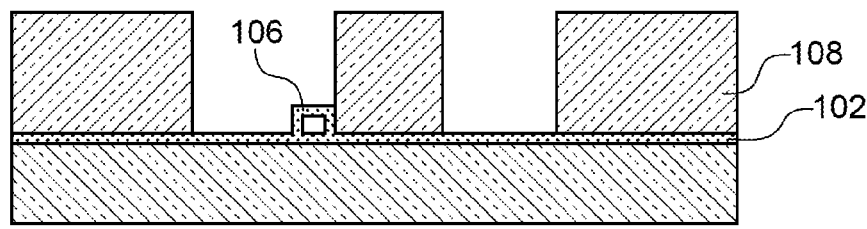

The etching thereof is then carried out, for example by RIE (reactive ion etching) or DRIE (deep reactive ion etching). The element thus formed is represented in FIG. 4D.

During a following step, the sensitive element and the gauge are freed by etching of the sacrificial layers, for example by hydrogen fluoride in vapour form.

Figure 4E:
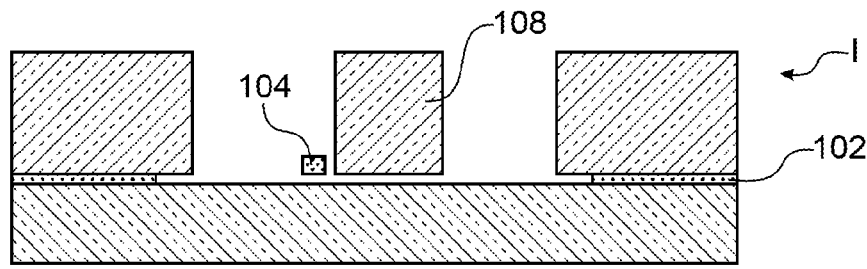

The element thus formed is represented in FIG. 4E.

On the other hand, a second sub-assembly is produced on the substrate (FIG. 4F to 4I).

Figure 4F:

The starting point is a substrate 110 for example made of silicon. The element thus formed is represented in FIG. 4F.

A layer 112 of dielectric material having a thickness for example of several tens of nanometers to several μm is then formed. This dielectric layer 112 may be for example silicon oxide, deposited by PECVD, LPCVD or by thermal oxidation. By a lithography and an etching of the layer 112, an opening is defined in the layer 112. A conducting layer 114, for example AlSi, is then formed of thickness varying for example from several hundreds of nanometers to several μm, produced by cathodic sputtering deposition for example (PVD) or by evaporation. A lithography and an etching of the conducting layer are then carried out, for example by RIE.

Figure 4G:
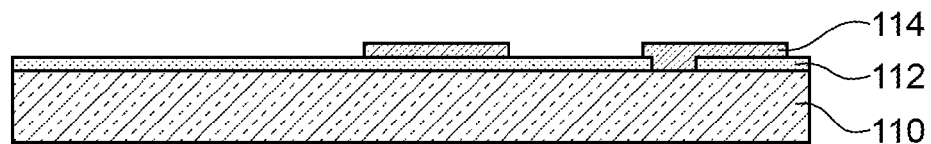

The element thus formed is represented in FIG. 4G.

A layer 116 of dielectric material having a thickness for example from several tens of nanometers to several μm is then formed. This layer is opened via lithography/etching. This set of technological steps may be repeated in order to produce one or more interconnection levels.

Figure 4H:
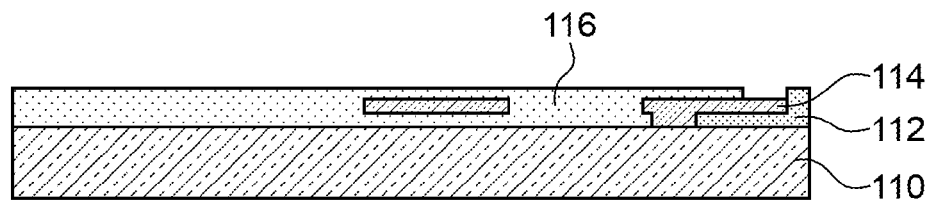

The element thus produced is represented in FIG. 4H.

For the final conducting layer a conduction material could advantageously be chosen, making it possible to carry out in parallel bonding of this cover substrate with the support substrate. This material will then depend on the chosen bonding technique, eutectic bonding, thermocompression for example. As an example, the case of a bonding carried out by formation of eutectic alloy has also been taken.

Figure 4I:
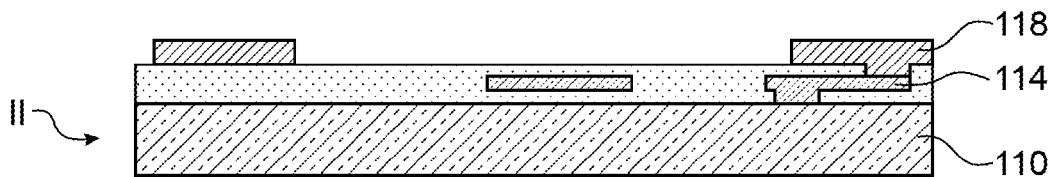

In FIG. 4I are represented bonding seams 118 made of Au produced with the technological steps already described above.

The two sub-assemblies A and B are then assembled such that the contacts of sub-assembly B are in contact with the walls of the cavities of sub-assembly A. In the example chosen, the assembly takes place by eutectic bonding between the Au bonding seams present on the cover substrate and the Si of the support substrate.

Figure 4J:
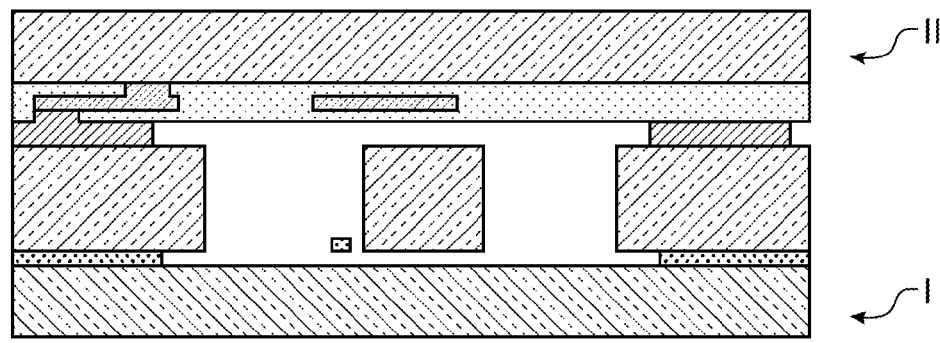

The element thus formed is represented in FIG. 4J.

Since the accelerometer according to the invention has a small pass band and low sensitivity to vibrations, it is particularly suited to industrial applications, in the automobile field and in the space field.

The invention claimed is:

1. A linear accelerometer comprising:
   a fixed part,
   a rotationally moving part in a plane of the accelerometer around an axis of rotation orthogonal to the plane of the accelerometer, the moving part comprising a center of gravity distinct from a point of intersection of the axis of rotation and the plane of the accelerometer,
   suspension means between the moving part and the fixed part, forming a pivot link between the moving part and the fixed part and limiting translational displacements of the moving part with respect to the fixed part,
   a detector for detecting the displacement of the moving part with respect to the fixed part,
   viscous damping means for damping the displacement of the moving part in said plane, said viscous damping means comprising interdigitated combs, at least one first comb on the moving part and at least one second comb on the fixed part, the first comb and the second comb being interdigitated and the first comb and the second comb being at the same electric potential.

2. The linear accelerometer according to claim 1, wherein the detector is distinct from the viscous damping means.

3. The linear accelerometer according to claim 1, wherein the fixed part comprises at least one outer portion surrounding the moving part and wherein the viscous damping means line a part at least of a periphery of the moving part.

4. The linear accelerometer according to claim 3, wherein the viscous damping means line the whole periphery of the moving part.

5. Linear The linear accelerometer according to claim 1, wherein said at least second comb of the fixed part and said at least first comb of the moving part are at a same electrical potential.

6. The linear accelerometer according to claim 1, wherein the moving part has a disc shape and wherein the first comb comprises fingers extending radially towards an outside of the moving part and the second comb comprises fingers extending radially from an outer portion of the fixed part to the moving part.

7. The linear accelerometer according to claim 6, wherein the fingers of the first comb and the fingers of the second comb are such that they have a central symmetry with respect to the axis of rotation of the moving part.

8. The linear accelerometer according to claim 6, wherein, each finger of the moving part comprising at least two faces, each face facing one face of a finger of the fixed part and at a given distance therefrom, at rest position of the moving part the given distance is identical for the two faces of the finger.

9. The linear accelerometer according to claim 3, wherein the moving part comprises a recess and the fixed part comprises an inner portion arranged in said recess and all or part of the suspension means suspend the moving part from the inner portion of the fixed part.

10. The linear accelerometer according to claim 9, wherein the suspension means comprise at least two beams extending between the moving part and the inner portion, said beams extending along two directions making a non-zero angle, comprised between 0° and 180°, said directions intersecting substantially at the intersection point of the axis of rotation and the plane of the accelerometer.

11. The linear accelerometer according to claim 1, wherein the detector is a piezoresistive detector.

12. The linear accelerometer according to claim 1, wherein the detector comprises at least two gauges mounted differentially, said gauges being aligned along an axis perpendicular to an axis going through the center of gravity of the moving part and the intersection point of the axis of rotation and the plane of the accelerometer.

13. The linear accelerometer according to claim 9, wherein the detector comprises at least two gauges mounted differentially, said gauges being aligned along an axis perpendicular to an axis going through the center of gravity of the moving part and the intersection point of the axis of rotation and the plane of the accelerometer and wherein the inner portion of the fixed part comprises several electrically independent zones enabling a "4-wire" measurement of the resistances of the gauges.

14. The linear accelerometer according to claim 1, comprising a cavity in which the moving part and the fixed part are housed and in which the pressure level is controlled.

15. The linear accelerometer according to claim 14, wherein the cavity is filled with viscous neutral gas, for example xenon or argon.

16. The linear accelerometer according to claim 9, wherein the suspension means comprise at least two beams extending between the moving part and the inner portion, said beams extending along two directions making an angle equal to 90°, said directions intersecting substantially at the intersection point of the axis of rotation and the plane of the accelerometer.

17. The linear accelerometer according to claim 14, wherein the cavity is filled with xenon or argon.

\* \* \* \* \*

UNITED STATES PATENT AND TRADEMARK OFFICE
CERTIFICATE OF CORRECTION

| | |
|---|---|
| PATENT NO. | : 10,371,711 B2 |
| APPLICATION NO. | : 15/454249 |
| DATED | : August 6, 2019 |
| INVENTOR(S) | : Bruno Fain et al. |

It is certified that error appears in the above-identified patent and that said Letters Patent is hereby corrected as shown below:

On the Title Page

Item (54), the title information is incorrect. Item (54) should read:
-- (54) DAMPED LINEAR ACCELEROMETER --

Signed and Sealed this
Twelfth Day of November, 2019

Andrei Iancu
*Director of the United States Patent and Trademark Office*